INVENTORS
JOHN C. HAWKINS
PHILIP WHYTE
WILLIAM T. B. MARCHANT

BY Watson, Cole, Grindle &
Watson
ATTORNEYS

United States Patent Office 2,942,360
Patented June 28, 1960

2,942,360
DITCHING MACHINES

John Clement Hawkins, 21 The Slade, Clophill, England, and Philip Whyte, 20 Queen's Drive, and William Thomas Bean Marchant, 15 Shaftsbury Ave., both of Bedford, England Filed June 18, 1956, Ser. No. 592,205

8 Claims. (Cl. 37—91)

This invention relates to power-operated mechanical ditching machines, and comprises an improvement in or modification of the invention forming the subject of United States patent Serial No. 442,719, now Patent Number 2,885,800, which concerns a ditching machine comprising a transverse beam adapted to be pivotally mounted by one end to one side of a vehicle such as an agricultural tractor so that it can rise and fall, a rotary cutter mounted on the outer end of the beam in a plane which is inclined to the direction of movement of the vehicle, and means for transmitting a drive to the rotary cutter.

According to the present invention, the beam constitutes a quadrilateral linkage whose outer end is capable of being raised and lowered, the said linkage comprising generally parallel upper and lower rigid lateral members pivoted at their inner ends respectively to upper and lower fixed points on the side of the vehicle and pivoted at their outer ends respectively to upper and lower points of a rigid link to which the cutter is secured. The quadrilateral linkage may comprise or approximate to a parallel motion linkage.

Conveniently the cutter may be driven from a power unit mounted on the vehicle through a rotary transmission member extending between the pivotal axes of the two ends of the upper lateral member of the beam. Such utilization of the axes of the rigid member as centers of the drive obviates difficulty due to change in length of the drive as the beam is raised and lowered. Thus in one convenient arrangement the power transmitting means may comprise a driving belt system passing around pulleys which are respectively co-axial with the pivotal axes of the two ends of the upper lateral member of the beam. The belt drive is thus kept well clear of the ground as it extends along the upper part of the beam.

According to a further feature of the invention the beam is raised by means of a lifting pack provided with an air reservoir arranged to act as a pneumatic spring providing a resilient support for the beam and the rotary cutter.

Figure 1:
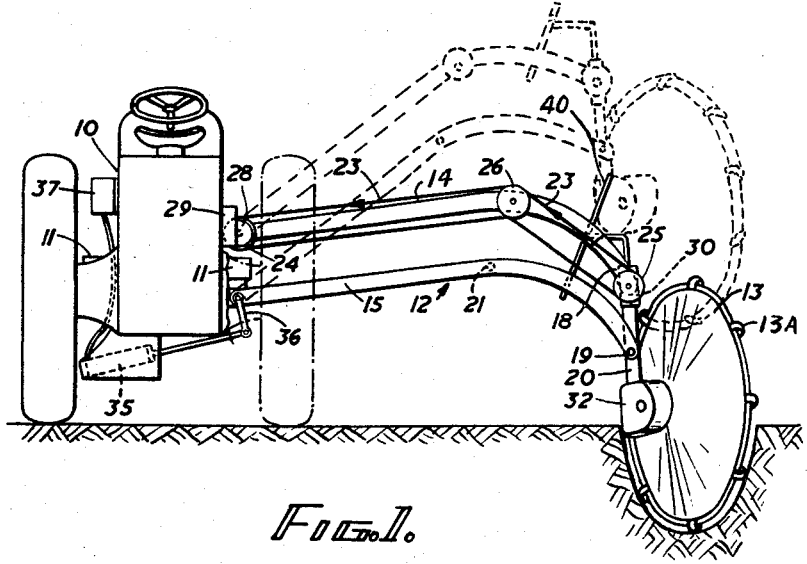
Figure 2:
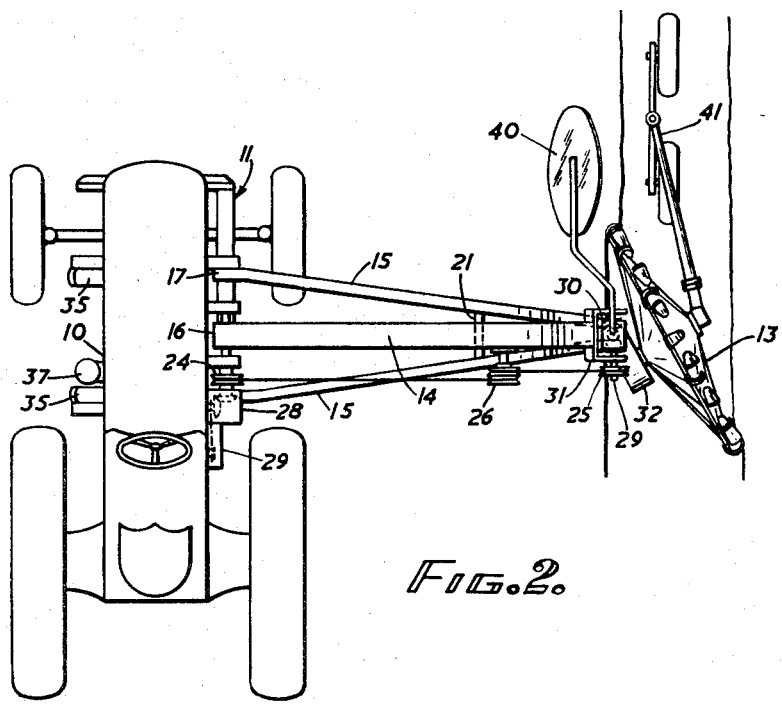

The invention may be carried into practice in various ways, but one specific embodiment will now be described by way of example with reference to the accompanying drawings, in which Figure 1 is a rear end view of a tractor equipped with a mechanical ditch cleaning attachment shown in operative position in full lines and in raised inoperative position in dashed lines, and Figure 2 is a plan of the tractor and attachment of Figure 1.

In the embodiment illustrated an agricultural tractor 10 is provided with an auxiliary framework 11 on which is pivotally mounted one end of a beam 12 which carries at its other end a rotary cutter 13, the beam 12 extending laterally from one side of the tractor between its front and rear axles in the manner described in the prior specification referred to above. The cutter 13 is provided with curved cutting blades 13A mounted on it at spaced points around its periphery.

In this case, however, the beam 12 comprises a parallel motion linkage formed by an upper arm 14 and a lower laterally extending frame member 15, which are respectively pivoted at their inner ends 16 and 17 to the tractor auxiliary framework 11 and at their outer ends 18 and 19 to a downwardly extending tubular member 20 on which the rotary cutter 13 is mounted. The upper member 14 comprises a single rigid arm while the lower frame member 15 is formed by a pair of similar rigid arms spaced apart horizontally side by side and interconnected by a horizontal cross brace 21. The single upper arm 14 is located above the lower frame 15 and extends approximately parallel to it when viewed in side elevation as in Figure 1. Thus the single upper arm 14 and the lower frame 15, together with the tubular member 20 to which they are pivoted at their outer ends, comprise a parallel motion linkage whose outer end can be raised and lowered bodily by rotation of the members about their pivots 16 and 17 on the tractor frame; this movement in turn raises and lowers the rotary cutter 13 supported by the tubular member 20 while maintaining the general orientation of the cutter.

The drive for the rotary cutter 13 is transmitted through V-belts 23 extending around end pulleys 24 and 25 respectively mounted coaxially with the pivotal axes of the inner and outer ends 16 and 18 of the upper arm 14 of the beam, and around intermediate pulleys 26 mounted on the arm 14. The inner end pulley 24 is driven through a gear box 28 by a chain drive from the belt pulley of the tractor shown in a casing 29, while the outer end pulley 25 drives the horizontal shaft 29 of a bexel gear-box 30 mounted between the two arms of a yoke 31 constituting the outer end 18 of the upper arm 14 of the frame. The gear-box 30 is mounted on the top of the downwardly extending tubular member 20, and transmits the drive to the upper end of a driving shaft (not shown) extending downwardly within the bore of the tubular member, the rotary cutter 13 being driven by the lower end of the shaft through a worm drive mounted within a gear casing 32. The general details of the rotary cutter itself are as described in the prior specification referred to.

Thus, since the belt drive operates around axes which coincide with the pivotal axes at the ends 16 and 18 of the rigid upper arm of the beam, the raising and lowering of the beam and cutter in operation will not disturb the belt tension or the characteristics of the drive.

In order to effect the raising and lowering of the beam and cutter at will, a pair of hydraulic jacks 35 are mounted on the tractor framework 11 and act on short radius arms 36 rigidly secured to the lower frame 15 of the beam coaxially with the pivotal axis of its inner ends 17. The operation of the jacks 35 serves to rotate the radius arms 36 about the said axis which in turn causes the rotation of the lower frame 15 and thus the raising or lowering of the whole beam 12 with the rotary cutter 13. Indeed, the beam can be raised right up to a position approaching the vertical, which may be convenient when the tractor is being driven to or from the place of work. An air reservoir 37 is associated with the lifting jacks and acts as a pneumatic spring to cushion and resiliently support the beam and cutter.

In other respects the apparatus is similar to that described and illustrated in the prior specification referred to. Thus the beam carries a deflector plate 40 to protect the tractor from earth and stones thrown by the rotating cutter 13. A supporting bogy 41 is secured to the axle of the cutter 13 in a position in which it will run along the ground or in the bottom of the ditch and so assist in supporting the beam and cutter during the operation of ditch cutting.

While in the embodiment illustrated the linkage constituting the beam has been described as a parallel motion linkage, it will be realized that the quadrilateral whose corners coincide with the four pivotal axes of the upper and lower beam members 14 and 15, as viewed in side elevation in Figure 1, need not always be a true parallelogram. In certain cases its opposite sides might depart slightly from a true parallel relationship in order to provide the linkage with a geometry affording a particular desired locus for the rotary cutter, as the beam is raised and lowered. Such arrangements are to be understood as being included within the scope of the present invention.

What we claim as our invention and desire to secure by Letters Patent is:

1. A ditching machine which comprises a transverse elongated support, pivot means at one end of the support for connection to one side of a vehicle, a rotary disc-like cutter mounted on the other end of the support, the cutter comprising a disc pivoted for rotation about the axis of the disc, the said disc being held in an operative position inclined obliquely to the direction of movement of the vehicle by the said support with the periphery of the disc extending downwardly below the support for engagement with the soil below the level of the ground surface on which the vehicle is supported, a plurality of cutting blades mounted on the disc at its periphery, and power-driven means for rotating the cutter about its pivotal axis, in which the support comprises a quadrilateral linkage whose outer end which carries the cutter is capable of being raised and lowered, the linkage comprising generally parallel rigid upper and lower lateral members provided with pivot means at their inner ends for pivotal connection to upper and lower fixed points on the side of the vehicle, and a rigid end link pivoted at upper and lower points to the outer ends of the lateral members, the rotary cutter being mounted on the end link, said power driven means including a driving belt system passing around pulleys which are coaxial with the pivotal axes of the two ends of the upper lateral member of the linkage.

2. A ditching machine as claimed in claim 1 in which the said quadrilateral linkage comprises a parallel motion linkage extending in a plane oblique to the said cutter disc.

3. A ditching machine which comprises a transverse elongated support, pivot means at one end of the support for connection to one side of a vehicle, a rotary disc-like cutter mounted on the other end of the support, the cutter comprising a disc pivoted for rotation about the axis of the disc, the said disc being held in an operative position inclined obliquely to the direction of movement of the vehicle by the said support with the periphery of the disc extending downwardly below the support for engagement with the soil below the level of the ground surface on which the vehicle is supported, a plurality of cutting blades mounted on the disc at its periphery, and power-driven means for rotating the cutter about its pivotal axis, in which the support comprises a quadrilateral linkage whose outer end which carries the cutter is capable of being raised and lowered, the linkage comprising generally parallel rigid upper and lower lateral members provided with pivot means at their inner ends for pivotal connection to upper and lower fixed points on the side of the vehicle, and a rigid end link pivoted at upper and lower points to the outer ends of the lateral members, the rotary cutter being mounted on the end link, including a pneumatic lifting jack provided with an associated air reservoir, the jack being coupled between the elongated support and the vehicle and being arranged to raise the outer end of the support and the rotary cutter carried thereby, and the air reservoir constituting a pneumatic spring which resiliently supports the elongated support and the cutter when raised by the jack.

4. A ditching machine which comprises a transverse elongated support, pivot means at the inner end of the support for pivotal connection to one side of a vehicle about inner pivotal axes parallel to the direction of movement of the vehicle, a rotary disc-like cutter comprising a disc pivoted for rotation about its own axis in a journal member carried by the said support at its outer end, the said disc being obliquely inclined to the said inner pivotal axes of the support and to the direction of movement of the vehicle, and the periphery of the disc extending downwardly below the support for engagement with the soil below the level of the ground surface on which the vehicle rests, a plurality of cutting blades mounted on the disc at its periphery, and power driven means for rotating the disc about its axis, in which the support comprises a quadrilateral linkage whose outer end which carries the journal member is capable of being raised and lowered, the said linkage comprising generally parallel rigid upper and lower lateral members provided with pivot means at their inner ends for pivotal connection about the said inner pivotal axes to upper and lower fixed points on the side of the vehicle, and a rigid end link pivoted at upper and lower points thereof about outer pivotal axes parallel to the said inner pivotal axes to the outer ends of the lateral members, the journal member being secured to the end link with the axis of rotation of the disc obliquely inclined to the said outer pivotal axes, said power-driven means including a driving belt system passing around pulleys which are coaxial with the inner and outer pivotal axes of one of the lateral members of the linkage and coupled to the disc, the belt system being arranged to rotate the disc about its axis by transmitting to it the drive of a power unit mounted on the vehicle.

5. A ditching machine as claimed in claim 4 in which the centers of the pivots at the inner and outer ends of the upper and lower lateral members of the linkage lie in a common vertical plane at right angles to the said inner and outer pivotal axes, the said plane being obliquely inclined to the cutter.

6. A ditching machine as claimed in claim 4 in which the said quadrilateral linkage comprises a parallel motion linkage.

7. A ditching machine as claimed in claim 4 in which the driving belt system drives the disc through a driving shaft extending coaxially through the end link and coupled at its lower end to the disc.

8. A ditching machine as claimed in claim 4 including a pneumatic lifting jack provided with an associated air reservoir, the jack being coupled between the elongated support and the vehicle and being arranged to raise the outer end of the support and the rotary cutter carried thereby, and the air reservoir constituting a pneumatic spring which resiliently supports the elongated support and the cutter when raised by the jack.

References Cited in the file of this patent

UNITED STATES PATENTS

| 1,762,441 | Johnson | June 10, 1930 |
| 1,912,706 | Goodman | June 6, 1933 |
| 2,526,396 | Nowlin | Oct. 17, 1950 |
| 2,685,751 | Bain | Aug. 10, 1954 |

FOREIGN PATENTS

| 121,330 | Australia | Apr. 30, 1946 |
| 75,661 | Netherlands | Aug. 16, 1954 |
| 200,904 | Australia | Feb. 15, 1956 |